United States Patent [19]

Kunath

[11] 4,030,878

[45] June 21, 1977

[54] METHOD AND APPARATUS FOR THE CONNECTION OF A ROTARY DRUM DRIVE OF A ROTARY FURNACE

[75] Inventor: Paul Kunath, Cologne, Germany

[73] Assignee: Klockner-Humboldt-Deutz Aktiengesellschaft, Germany

[22] Filed: Jan. 20, 1976

[21] Appl. No.: 650,619

[30] Foreign Application Priority Data

Jan. 23, 1975 Germany .......................... 2502612

[52] U.S. Cl. .................................. 432/45; 432/103; 318/430; 318/453; 318/459; 318/490; 34/55
[51] Int. Cl.² .......................... F27B 7/00; F27B 9/40
[58] Field of Search ............. 318/430, 9, 453, 120, 318/459, 474, 490; 432/103, 36, 118, 45, 46; 34/55, 43

[56] References Cited

UNITED STATES PATENTS

| | | | |
|---|---|---|---|
| 2,675,542 | 4/1954 | Kress | 318/490 |
| 3,257,104 | 6/1966 | Manland | 432/45 |

Primary Examiner—John J. Camby
Assistant Examiner—Henry C. Yuen
Attorney, Agent, or Firm—Hill, Gross, Simpson, Van Santen, Steadman, Chiara & Simpson

[57] ABSTRACT

A method and apparatus for connecting a rotary drum drive, particularly a rotary drum drive of a rotary furnace or kiln, after disconnection for a short time, and before standstill of the oscillating drum, features detecting the movement of the oscillating drum and connecting the drive motor at a turning point of the oscillation or upon agreement with the direction of movement and the driving direction.

19 Claims, 4 Drawing Figures

METHOD AND APPARATUS FOR THE CONNECTION OF A ROTARY DRUM DRIVE OF A ROTARY FURNACE

BACKGROUND OF THE INVENTION

1. Field of the Invention

This invention relates to a method and apparatus for the connection of a rotary drum drive, particularly a drive of a rotary furnace, after disconnection of the same for a short time and before the oscillating drum reaches a standstill condition.

2. Description of the Prior Art

It is well known in the art that rotary drum and rotary furnace drives are primarily constructed as thyristor controlled direct current drives. Through the inclined position of the drum or combustion material carried thereby and upon addition of material on one side of the drum, the rotating drum swings, or in a rotary furnace the rotary furnace pipe swings, as a pendulum in an oscillatory manner for several minutes about a point of equilibrium after disconnection of the drive. In order to prevent, upon reconnection of the drive, a swing of the rotary drum or rotary furnace in a direction opposite to that of the drive direction, it has heretofore been the practice in rotary furnace drives to provide a time delay of about 5 to 10 minutes before a new connection was possible. It was thereby ensured that the rotary furnace had come to a standstill before reconnection. This great safety time interval, however, particularly in connection with large rotary furnace installations, was found to be very disturbing, as the reconnection in the normal course of operation could have taken place more rapidly and often in much shorter time after the disconnection, but for the requirement that the oscillating part reach a standstill condition. Particularly upon introduction or upon taking into operation, respectively, of a new rotary drum or a rotary furnace installation, or upon inspections of such equipment, the drive must be disconnected more frequently, so that the unproductive standstill periods and waiting periods accumulate and therefore lead to an overall less efficient operation.

SUMMARY OF THE INVENTION

In view of the foregoing, I have taken, as the primary object of this invention, the task of providing reconnection techniques which prevent the aforementioned disadvantages which have heretofore occurred with the type of drive mentioned above.

In realizing a solution for this object, the condition of movement of the swinging rotary drum is determined and the drive motor of the rotary drum is connected either at the turning point of the swinging movement or upon agreement of the direction of the swinging movement with the normal driving direction. In this manner, it is possible to reconnect the drive of a rotary drum in a short time after disconnection of the drive. The standstill times of drives of rotary drums are, in this manner, substantially decreased in comparison with hitherto known installations. This again provides a very favorable effect upon the charge output.

In the development of the method according to the present invention, it is provided that the condition of movement of the swinging rotary drum is determined, that a voltage is generated in response to movement of the swinging rotary drum and that the direction and magnitude of the voltage, which is produced in the armature of the drive motor, is measured through the rotary movement of the armature of the drive motor with respect to the excited field winding. For each reconnection of the rotary drum drive before damping of the swinging movement, the knowledge of both amounts or sizes coupled directly with the swinging movement is advantageous, so that thereafter, the correct point of time for the reconnection may be selected. The magnitude of the generated voltage is a measure of the speed of the rotary movement and the direction of the voltage vector characterizes the particular direction of rotation, and armed with such knowledge, an intrusion into a swing of the drum in the direction of movement opposite to the normal direction of rotation is thus prevented. A further advantage results if the connection takes place in the normal direction of drive upon reversal of the swinging movement from the opposite direction of rotation. In this connection, the innate potential energy comes to the advantage of the rotary drum to be driven upon attainment of the highest counter-swinging position with a lower requirement of driving energy.

As a result, the maximum or peak current connection is appreciably diminished and thereby the load of the electric network is decreased at the moment of starting.

An advantageous further embodiment of the method resides in the techniques that the voltage produced upon swinging of the rotary drum drive, according to size and spatial position in the two-dimensional reference system is transferred to a semiconductor combination connection, measured, and after comparison with theoretical prescriptions, is utilized by the semiconductor combination connection as a pulse which actuates an auxiliary relay of the rotary drum motor. According to this feature, the generated voltage is not only measured, and according to its vector direction eliminated, but also after comparison with theoretical values, is used for providing a pulse which, through an auxiliary relay, brings about the release of the main protection device for the motor circuit.

The invention further relates to a device which, according to the invention, carries out the reconnection of the rotary drive and which features a null voltmeter connected in parallel with a voltmeter in the motor circuit of the driving motor, the null voltmeter being provided with a spread starting area. A theoretical value comparison device and an auxiliary relay for a protection for the driving motor circuit are also connected in parallel thereto. Through this device it is ensured that, upon activation of the reconnection switch, a first connection of an air exhauster for the excitation coils and for the connection devices and a theoretical comparison takes place for the swinging movement of the rotary drum before the auxiliary relay is connected with the motor protection equipment of the drive motor.

In a development of the device according to the invention, it is provided that a semiconductor combination connection is provided as a semiconductor structural part fixed to the rear side of the voltmeter in a motor circuit. The semiconductor structural part comprises a base and structural groups releasably connected with the base for an auxiliary voltage supply unit, a measuring unit, a compensation unit and the relay unit, and the same is attached electrically in parallel with the voltmeter. Such a device may also subsequently be installed in existing installations in the connection circuit. The functional units are formed of structural groups which permit of being disposed in such a small space that the entire device may be mounted on the rear side of the voltmeter which is, in any case, present in the driving circuit of the rotary drum driving motor. An individual auxiliary voltage supply unit ensures the reliability of the measuring circuit function. A further advantage is to be seen in that the measuring and relay groups are easily exchangeable and may be quickly adapted to changed conditions. With the aid of these devices, not only is the standstill time of the rotary drum drive shortened, but advantageously also for the driving means, particularly for the drive aggregates, a protection is offered which relieves the operating personnel and decreases the driving energy demanded of the network.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
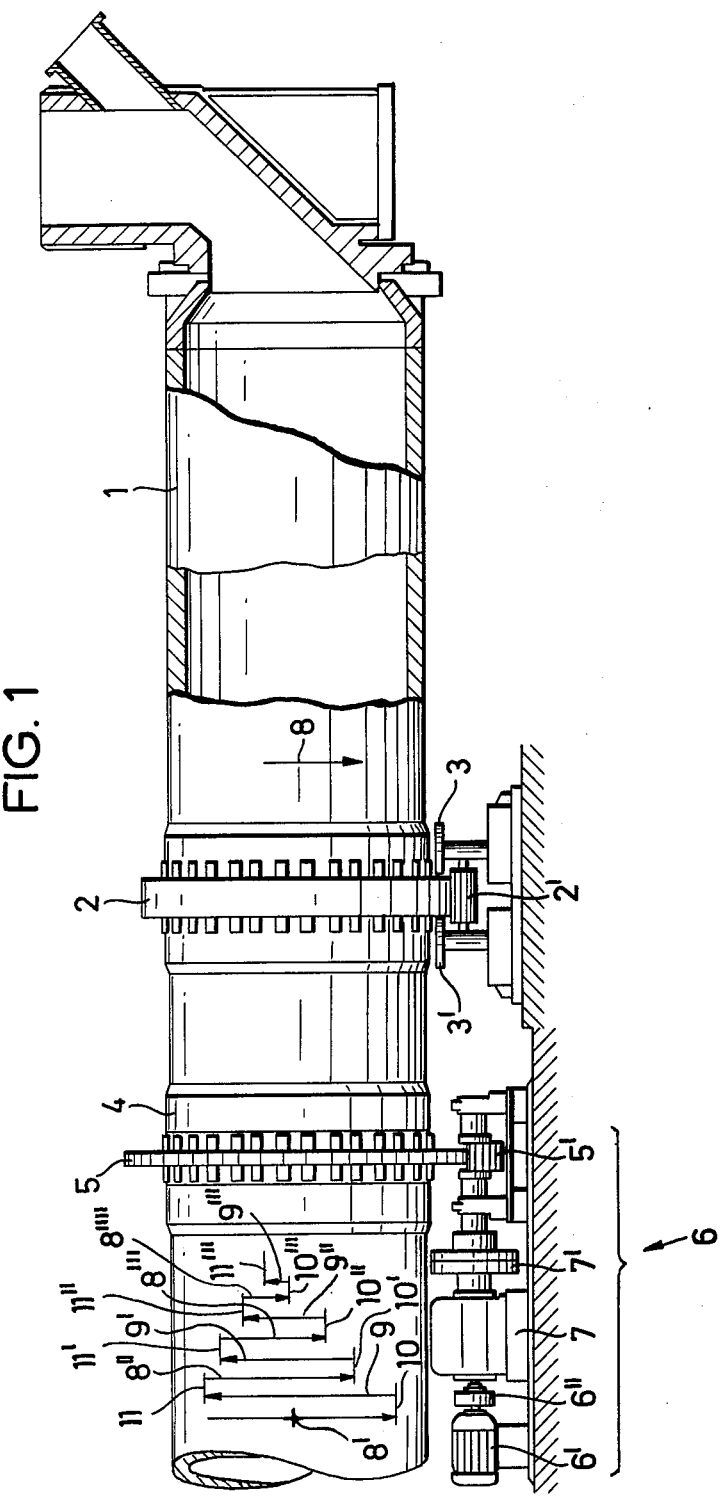
FIG. 1 is an elevational view of a portion of a rotary furnace or kiln installation.

FIG. 1 illustrates the input side of a rotary furnace or kiln as is used, for example, in the cement industry, having charging or infeed devices. The rotary furnace or kiln comprises a cylinder 1 which is provided over its length at several spaced locations with sleeve reinforcements and is positioned by means of guide rings 2 fixed thereto and rollingly supported on guide rollers 2'. At least one pair of rollers 3 and 3' are supported and positioned so as to receive and take up the axial thrust of the cylinder 1 and to maintain a horizontal shifting tolerance.

A rim gear 5 is carried on a sleeve reinforcement 4 of the rotary furnace or kiln cylinder 1 and engages a pinion 5' of a rotary drive 6. The drive 6 comprises an electric motor 6', a coupling 6", a reduction gear arrangement 7, a second coupling 7', and the drive pinion 5'. For a further reduction to a slow speed, an additional gear or gears may be included in the drive 6. If such is needed, and the same is not illustrated here, auxiliary drives, independent of current, may be provided with Otto carburetor engines.

The rotary furnace or kiln cylinder 1 is driven in the direction illustrated by the arrow 8. After a disconnection of the rotary furnace or kiln drive 6, at the moment of the position of the cylinder 1 referenced 8', the cylinder 1 moves first further in the same direction until it comes to a temporary standstill at a position 10. The movement of the cylinder 1 is determined by a lateral deposit of the sinter material in the furnace and thereby to a shifting of the sinter of gravity of the mass from the center of the cylinder 1, and by the direction of movement of the cylinder. The sinter material located in the rotary furnace or kiln cylinder 1 and supply of material on one side of the cylinder lead, therefore, after disconnection of the rotary drive motor, to a swinging or pendulum type movement of the cylinder 1 from its position 10 in the direction of the arrow 9 back to a reversal point 11, then in the direction of the arrow 8" to a position 10', and from the latter again in the opposite direction of rotation, as indicated by the arrow 9' back to a position 11'. Whether further swings occur in the directions indicated by the arrows 8''', 9''', 8'''', and 9''', etc follow, depends in each case on the friction occurring and the mass distribution in the rotary furnace cylinder 1. With low frictional losses and greatly non-uniform material adhesions in the cylinder 1, the swinging may be repeated many times before the same is damped and the cylinder comes to rest at a position 11'''. This swinging procedure is observed also on the rotary drum and similar aggregates after their disconnection.

A reconnection of the drive should take place only upon a swinging movement in the direction 8', 8'', 8''' or 8'''', that is, proper to the normal drive direction. Negative experiences with false connection upon opposite swinging and the damage resulting in connection therewith through overload of the driving pinion have, in connection with the previously known installations, lead to the fact that a reconnection lock of 5 to 10 minutes had to be provided. This period of time is so dimensioned that the swinging movement ends reliably and the furnace has come to a standstill.

Figure 2:
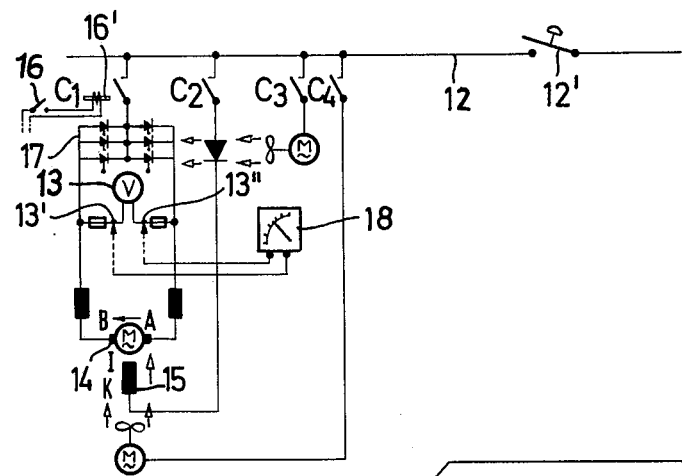
FIG. 2 is a schematic circuit diagram of a direct current motor with a thyristor control circuit for driving a rotary furnace or kiln such as illustrated in FIG. 1.

FIG. 2 is a greatly simplified schematic circuit representation of the direct current circuit for the drive 6 of the rotary furnace or kiln with thyristor control. Only one side of the dc supply has been illustrated for purpose of clarity and simplification. On the current supply conductor 12, after a main supply switch 12' are the branches for the main motor contactor C1, a field excitation contactor C2, an air exhauster contactor C3 and an motor air exhauster contactor C4. The connection of the electric drive takes place in sequence so that first the cabinet and motor air exhauster contactors C3 and C4 are connected before the contactor C2 is closed to energize the field excitation winding 15. Through an auxiliary relay 16, the main motor contactor C1 is locked, as long as the air exhauster and the field excitation winding 15 have not been place in operation. Then, the auxiliary contactor 16, 16' can initiate the actuation of the main motor contactor C1, whereby the direct current armature 14 is connected to the supply line 12 by way of thyristors 17, as is well known in the art, to effect energization and drive of the rotary furnace or kiln. A voltmeter 13 is connected at 13' and 13" across the armature to monitor the armature voltage.

If, after a disconnection of the contactor C1, the rotary furnace or kiln rotates further, then the motor functions as a generator and the armature coil 14 of the motor has a voltage thereacross whose vector corresponds to the direction of rotation and whose magnitude is dependent upon the rate of rotation of the furnace. With the movement damping and becoming slower, the voltage generated becomes less and less and at a reversal point, for example at the point 10 in FIG. 1, its value is null or zero. Upon a return swing of the cylinder 1 in the direction 9, according to FIG. 1, a voltage is generated having a reverse directed vector which first becomes greater with increasing acceleration and up to the turning point at 11 again drops to zero, as at the turning point the cylinder temporarily comes to a standstill. Upon the further movement of the cylinder 1 in the direction of the arrow 8'', again a voltage is generated which has an oppositely oriented vector and a magnitude which increases with acceleration and decreases as the cylinder approaches the turning point 10'. After passage through the turning point 10' and movement in the direction 9', the same type of voltage generation occurs, and the same is repeated with each swing of the cylinder until the same comes to rest, for example, at a point 11'''.

Figure 3:
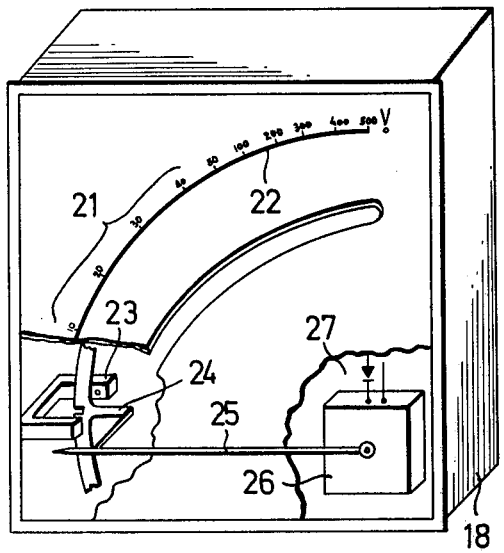
FIG. 3 illustrates a null or zero voltmeter having connecting or switch means.

FIG. 3 illustrates a null or zero voltmeter 18 having a spread out starting area 21 on a measuring scale 22. In the vicinity of a null or zero point of the scale a contactless contact maker 23 is provided which is actuated by a lug or vane 24 on the instrument indicator 25 of the measuring unit 26 of the voltmeter 18. The contactless contact maker 23 may be of any well known type, such as magnetic, optic or the like. A diode 27 which is connected in circuit as a locking diode to the instrument measuring unit 26 permits only the voltage produced in the counter direction to take effect and move the indicator 25; that is, in normal operation, the indicator 25 of the null or zero voltmeter 18 rests at the zero point. In the case of a swing of the rotary furnace cylinder 1 in the opposite direction of rotation, the magnitude of the particular rotational speed is indicated by the indicator 25 by the size of the generated voltage deflection. This means, upon voltage indication on the zero instrument 18, the rotary furnace cylinder 1 rotates in the direction of rotation which is not desired, that is in the direction 9, 9', etc, according to FIG. 1. With a swing in a similar sense as the direction of the cylinder as indicated by the arrows 8', 8'', 8''', and 8'''' of FIG. 1, the zero voltmeter 18 provides no indication in that the diode 27 blocks the generated voltage. When the rotary furnace is prepared for operation, the drive is immediately connected, because the auxiliary relay 16 which operates the contactor C1 is connected to and operated by the contact maker 23 of the zero voltmeter 18. The zero voltmeter 18 illustrated in FIGS. 1 and 3 is attached with two attachments parallel to the driving voltmeter 13 at the terminals 13' and 13'' as mentioned above, and is insertable in the thyristor cabinet of the direct current drive apparatus.

As indicated above, the contact maker 23 of the zero voltmeter 18 may be constructed as an inductive, capacitive, optical or other type of contact-free transferring-type switch element which is actuated through the mechanism of the indicator movement.

A voltmeter with centrally disposed null or zero point may also be utilized, in which case the contact maker is similarly connected.

Figure 4:
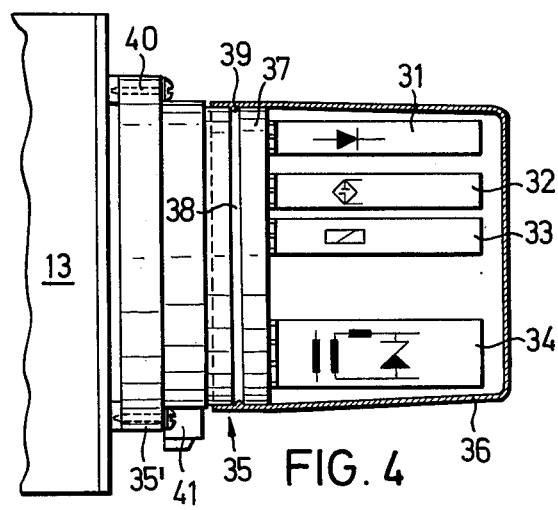
FIG. 4 illustrates a semiconductor combination structural part carried on the rear of a voltmeter which is normally in the motor circuit.

A further advantageous feature of the present invention makes use of the characteristics of semiconductor combination connections, through which a generatively produced voltage measured according to magnitude and vector position in a two-dimensional reference system is transferred to a compensation unit 32 and evaluated. In FIG. 4, a semiconductor structural part 35 having a base 35', for a rotary furnace drive is illustrated, in which fully electrically operating semiconductor structural groups are utilized. The base 35' includes pick-ups and switch means for the releasable connection of the functional units 31, 32, 32 and 34 with the base 35'.

The semiconductor unit 31 essentially includes a structural element combination which indicates the voltage vector and eliminates the non-desired vector direction. This structural element combination may be realized with diodes and is therefore provided with a diode symbol.

The compensation unit 32 serves for the theoretical comparison voltage to zero. It is essentially equipped with compensation bridges through which it is determined whether the measured voltage lies in the range of null or zero. If this is the case, the relay unit 33 is excited, which, briefly stated, acts on the auxiliary relay 16 of the contactor C1 in FIG. 2. The auxiliary voltage is necessary for operation of the functional units 32 to 33 in the semiconductor structural part 35 must remain constant to a high degree independently of fluctuations in network and operational influences. To this end, advantageously an auxiliary voltage supply unit 34 is provided, and in such a manner that the mains or supply voltage is transformed on or to the measuring circuit voltages, rectified, regulated and distributed, as is well known in the art. Through this voltage supply individual to the structural part, the accuracy of the measuring and regulating operations is ensured and the reconnection device encircle as a simple structural part with a small space requirement. The functional units 31 to 33 are inserted into the base 35' with terminal contacts and printed switch paths attached hereto. For protection against dust and mechanical influences, a protective hood 36 is provided which, in a known manner, is placed in an inverted position through a section of the base 35' which is tapered and identified as a fitted part 37. At least one groove 38 is provided in the fitted part 37 to receive an inner bead 39 on the rim of the protective hood 36 to thus seal and close off the switching device. Fastening takes place through bores 40, for example, by means of screws on the rear side of the operating voltmeter 13. From the terminals 41, connections to the terminals 13' and 13'' of the voltmeter are extended to the auxiliary relay 16 and to the network 12. The provision and dimensioning of the individual functional units 31 and 32 takes place with semiconductor elements according to the circumstances and the particular installation. All units, both the measuring units as well as the switch or connection unit 34, are exchangeably provided and mounted with Zener diodes such that in the case of a substitute mounting, as also with the first-mentioned layout, each functional unit is individually and thoroughly capable of examination.

By practicing the present invention, the costly periods of standstill in the operation of a rotary drum and a rotary furnace are decreased to a noticeable extent. Additionally, a particular advantage of the invention is to be seen in that a very small, reliably operating structure and verifiable auxiliary device is provided such that not only is the attention and stress of the operating personnel decreased, but also an improved protection for the valuable operating elements of the rotary furnace installation, involving relatively high expense in the case of disturbance, is attained.

The utilization of the present invention with rotary drum drives, for example on drying and cooling drums, or on tube mills, takes place in an analogous manner according to the discussion provided herein for the specific example of a rotary furnace, with the same advantages.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of reconnecting the armature of a motor to an electrical supply shortly after disconnection, in an installation in which the motor drives a rotary drum which undergoes damped oscillations after disconnection, and before the drum damps to a standstill condition, comprising the steps of:

measuring the direction of movement of the oscillating drum; and reconnecting the armature to the supply upon detection that the drum is not moving in a direction opposite to the normal driving direction.

2. The method of claim 1, wherein the step of reconnecting is further defined as:

reconnecting the armature upon measuring a null point in the oscillatory movement of the drum.

3. The method of claim 1, wherein the step of reconnecting is further defined as:

reconnecting the armature upon measuring movement in the normal driving direction.

4. A method of reconnecting the armature of a drive motor to an electrical supply in an installation in which the drive motor has an energized field winding and the motor is coupled to drive a drum which undergoes damped oscillation about its axis of rotation upon deenergization of the armature, reconnection to occur shortly after disconnection and before the drum damps to a standstill condition, comprising the steps of:

detecting the magnitude and direction of the voltage generated across the armature due to rotation thereof through the field of the field winding; and reconnecting the armature to the supply upon detection of a zero in the generated voltage.

5. The method of claim 4, comprising the steps of:

comparing the generated voltage with a theoretical reference zero;

generating a pulse upon agreement of the generated voltage and the theoretical reference zero; and applying the pulse to a relay circuit to reconnect the armature to the the electrical supply.

6. An installation comprising:

a rotary drum which undergoes damped oscillatory motion when a driving force is removed;

a drive motor coupled to said drum and including an energized field winding and an armature, contactor means operable to connect and disconnect the armature and an electrical supply;

apparatus for reconnecting said armature to the electrical supply after disconnection and before said drum damps to a standstill condition, said apparatus including a meter mechanism including coil means connected across said armature and energized by the voltage induced in said armature by said field winding and a movable member responsive to the energization of said coil means to define along a prescribed path;

switch means disposed on said prescribed path at a point corresponding to a zero of the generated voltage and operated in response to said movable member moving to that point; and means operatively connecting said switch means and said contactor means to reconnect said armature upon operation of said switch means.

7. The installation of claim 6, wherein said apparatus includes:

a housing including a surface bearing an indicia relation to generated voltage, said meter mechanism and said switch means mounted in said housing, and said movable member including a first portion for operating said switch means in said housing and a second portion outside of said housing serving as an indicator with respect to said indicia.

8. The installation of claim 7, comprising:

means connected to said meter movement to prevent a response to voltages corresponding to the normal direction of rotation.

9. The installation of claim 8, wherein the last-mentioned means comprises a diode.

10. The installation of claim 7, wherein said indicia indicates a null position at center scale and rotation in opposite directions on opposite side of the null position.

11. An installation comprising:

a rotary drum which undergoes damped oscillatory motion when a driving force is removed;

a drive motor coupled to said drum; and apparatus for connecting said drive motor to an energy supply, after disconnection, before said drum damps to a standstill, said apparatus including first means for detecting the direction of movement of said drum and generating a voltage whose magnitude corresponds to drum acceleration and whose direction corresponds to drum direction of movement;

second means connected to said first means and responsive to a voltage null to provide an output signal; and third means connected to said second means and to said drive motor for connecting said drive motor to the energy supply in response to said output signal.

12. An installation according to claim 11, wherein said motor is an electric motor having an energized field winding and an armature coupled to said drum and connected and disconnected by, said third means, said first means includes coil means connected across said armature and energized by the voltage generated therein in response to movement of said armature through the field of said field winding, said coil means including a movable member which moves along a path in accordance with the energization of said coil means, and said second means includes switch means mounted along said path and responsive to the movement of said movable member to provide said output signal.

13. An installation according to claim 12, wherein said switch means comprises an inductively operated switch.

14. An installation according to claim 12, wherein said switch means comprises an optical switch.

15. An installation according to claim 12, wherein said switch means comprises a capacitive switch.

16. An installation according to claim 12, wherein said third means comprises a relay circuit having an operating winding connected to said switch means and a contactor connecting said armature to an electrical supply.

17. An installation according to claim 11, wherein said motor is an electric motor having an energized field winding and an armature coupled to said drum and connected to and disconnected from an electrical supply by said third means, said second means includes means for comparing the generated voltage with a theoretical reference zero to produce said output pulse, and said third means comprises relay means responsive to said output pulse to effect connection of said armature to the electrical supply.

18. An installation according to claim 17, comprising:
- a voltmeter connected across said armature, said voltmeter having a first housing; and
- a second housing connected to said first housing and comprising a base carrying a printed circuit adapted to receive plug-in units and a cover releasably engaging said base, said printed circuit having a pair of terminals electrically connected in parallel with said voltmeter, said first, second and third means being semiconductor plug-in units received in said printed circuit, and further comprising a semiconductor plug-in auxiliary voltage unit received in said printed circuit.

19. An installation comprising:
- a rotary drum which undergoes damped oscillating motion when a driving force is removed;
- a drive motor coupled to said drum;
- means measuring the direction of movement of the oscillating drum; and
- means reconnecting the motor to a supply upon detection that the drum is not moving in the direction opposite to the normal driving direction.

* * * * *